United States Patent
Eastham et al.

(10) Patent No.: US 8,059,819 B2
(45) Date of Patent: Nov. 15, 2011

(54) SYSTEMS AND METHODS FOR DISTRIBUTING UPDATES FOR A KEY AT A MAXIMUM REKEY RATE

(75) Inventors: W. Bryant Eastham, Draper, UT (US); Thomas A. Milligan, South Jordan, UT (US); James L. Simister, Pleasant Grove, UT (US)

(73) Assignee: Panasonic Electric Works Co., Ltd., Osaka (JP)

(*) Notice: Subject to any disclaimer, the term of this patent is extended or adjusted under 35 U.S.C. 154(b) by 1338 days.

(21) Appl. No.: 11/624,147

(22) Filed: Jan. 17, 2007

(65) Prior Publication Data

US 2008/0170692 A1 Jul. 17, 2008

(51) Int. Cl.
*H04L 9/08* (2006.01)
(52) U.S. Cl. ......... 380/278; 380/277; 380/281; 380/284
(58) Field of Classification Search ............ 380/27, 380/277–286
See application file for complete search history.

(56) References Cited

U.S. PATENT DOCUMENTS

| | | | |
|---|---|---|---|
| 5,148,479 A | 9/1992 | Bird et al. | |
| 5,287,537 A | 2/1994 | Newmark et al. | |
| 5,778,065 A | 7/1998 | Hauser et al. | |
| 6,049,878 A * | 4/2000 | Caronni et al. | 726/3 |
| 6,195,751 B1 * | 2/2001 | Caronni et al. | 713/163 |
| 6,591,364 B1 | 7/2003 | Patel | |
| 7,007,040 B1 * | 2/2006 | Duke et al. | 1/1 |
| 7,107,620 B2 | 9/2006 | Haverinen et al. | |
| 7,123,719 B2 * | 10/2006 | Sowa et al. | 380/247 |
| 7,266,687 B2 * | 9/2007 | Sowa et al. | 713/163 |
| 7,424,116 B2 * | 9/2008 | Sowa et al. | 380/247 |
| 7,522,727 B2 * | 4/2009 | Sowa et al. | 380/247 |
| 2002/0154781 A1 * | 10/2002 | Sowa et al. | 380/278 |
| 2004/0005061 A1 * | 1/2004 | Buer et al. | 380/282 |
| 2006/0193473 A1 * | 8/2006 | Fu | 380/277 |

FOREIGN PATENT DOCUMENTS

WO WO 0654927 A1 * 5/2006

OTHER PUBLICATIONS

Ghanem et al. "A secure group key management framework: design and rekey issues" Proceedings of the Eighth International IEEE Symposium on Computers and Communication, Sep. 23, 2003. (6 pages).*
Yang, Richard et al. "Reliable Group Rekeying: A Performance Analysis" Proceedings of the 2001 Conference on Applications, technologies, architectures, and protocols for computer communications. pp. 27-38.*
Li, Xiaozhou Steve et al. "Batch Rekeying for Secure Group Communications" Proceedings of the 10th International Conference on the World Wide Web, © 2001. pp. 525-534.*

* cited by examiner

*Primary Examiner* — Kim Vu
*Assistant Examiner* — Thomas Gyorfi
(74) *Attorney, Agent, or Firm* — Austin Rapp & Hardman

(57) ABSTRACT

A method for distributing updates for a key is described. One or more update requests are received per unit of time. The number of received update requests per unit of time is multiplied by a maximum update period to estimate the number of active nodes in a group. The total number of received update requests per unit of time is determined. An amount representing additional update requests per unit of time is obtained from the difference between the total number of received updates and a determined maximum. A minimum update period for a group of nodes is determined.

16 Claims, 7 Drawing Sheets

SYSTEMS AND METHODS FOR DISTRIBUTING UPDATES FOR A KEY AT A MAXIMUM REKEY RATE

TECHNICAL FIELD

The present invention relates generally to computers and computer-related technology. More specifically, the present invention relates to systems and methods for distributing updates for a key at a maximum rekey rate.

BACKGROUND

Computer and communication technologies continue to advance at a rapid pace. Indeed, computer and communication technologies are involved in many aspects of a person's day. For example, many devices being used today by consumers have a small computer inside of the device. These small computers come in varying sizes and degrees of sophistication. These small computers include everything from one microcontroller to a fully-functional complete computer system. For example, these small computers may be a one-chip computer, such as a microcontroller, a one-board type of computer, such as a controller, a typical desktop computer, such as an IBM-PC compatible, etc.

Computers typically have one or more processors at the heart of the computer. The processor(s) usually are interconnected to different external inputs and outputs and function to manage the particular computer or device. For example, a processor in a thermostat may be connected to buttons used to select the temperature setting, to the furnace or air conditioner to change the temperature, and to temperature sensors to read and display the current temperature on a display.

Many appliances, devices, etc., include one or more small computers. For example, thermostats, furnaces, air conditioning systems, refrigerators, telephones, typewriters, automobiles, vending machines, and many different types of industrial equipment now typically have small computers, or processors, inside of them. Computer software runs the processors of these computers and instructs the processors how to carry out certain tasks. For example, the computer software running on a thermostat may cause an air conditioner to stop running when a particular temperature is reached or may cause a heater to turn on when needed.

These types of small computers that are a part of a device, appliance, tool, etc., are often referred to as embedded devices or embedded systems. (The terms "embedded device" and "embedded system" will be used interchangeably herein.) An embedded system usually refers to computer hardware and software that is part of a larger system. Embedded systems may not have typical input and output devices such as a keyboard, mouse, and/or monitor. Usually, at the heart of each embedded system is one or more processor(s).

Embedded systems may be used to monitor or control many different systems, resources, products, etc. With the growth of the Internet and the World Wide Web, embedded systems are increasingly connected to the Internet so that they can be remotely monitored and/or controlled. Other embedded systems may be connected to computer networks including local area networks, wide area networks, etc. As used herein, the term "computer network" (or simply "network") refers to any system in which a series of nodes are interconnected by a communications path. The term "node" refers to any device that may be connected as part of a computer network.

Some embedded systems may provide data and/or services to other computing devices using a computer network. Alternatively, there may be typical computers or computing devices that provide data and/or services to other computing devices using a computer network. Sometimes it is beneficial to minimize the number of key exchanges required to maintain secure connections. Using large numbers of key exchanges can cause additional traffic over the network. These situations, as well as others, may cause inefficiencies in communication across the network. Benefits may be realized if systems and methods were available to provide for efficiently distributing updates for a key.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
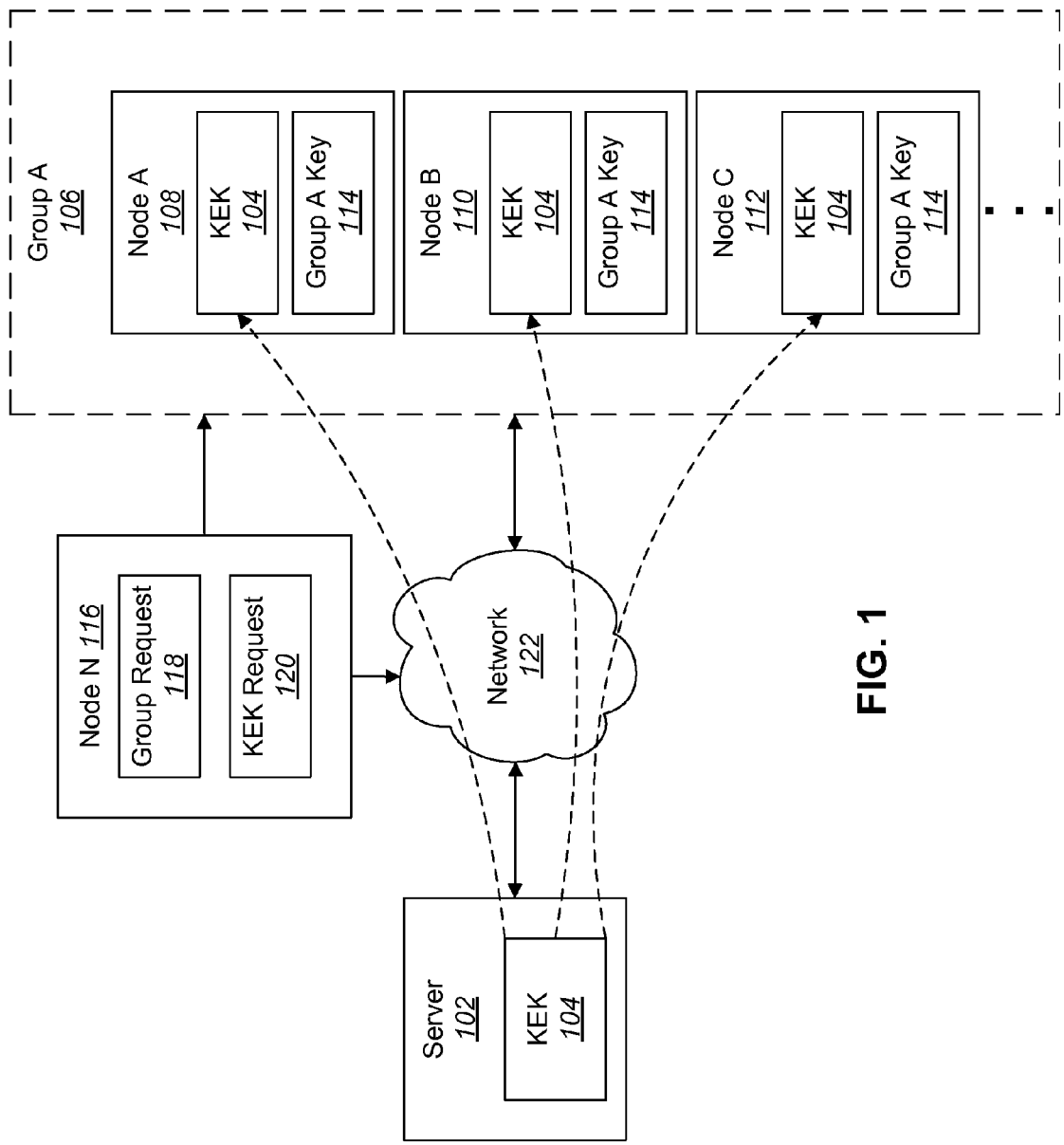
FIG. 1 is a block diagram illustrating one embodiment of a server communicating a key exchange key (KEK) to one or more nodes within a group.

A method for distributing updates for a key is described. One or more update requests are received per unit of time. The number of received update requests per unit of time is multiplied by a maximum update period. A total number of received update requests per unit of time is determined. An amount representing additional update requests per unit of time is obtained. A minimum update period is determined for a group of nodes.

In one embodiment, the amount representing additional update requests per unit of time is obtained by subtracting the determined total number of received update requests per unit of time from a determined maximum of update requests desired per unit of time. The minimum update period may be determined by multiplying the number of received update requests per unit of time with a maximum update parameter and dividing this product by the amount representing additional update requests per unit of time. An update request may be received from a single node during each minimum check period. In one embodiment, the update request comprises a request to rekey a key exchange key (KEK). The KEK may be used to join a secure multicast group of nodes.

A minimal state regarding a group of nodes may be maintained, wherein the minimal state comprises nodes that may obtain the KEK and join the group. The maximum update period may represent the maximum amount of time a node utilizes a KEK before sending an update request. Multiplying the number of received update requests per unit of time by a maximum update period may provide an estimate of the number of active nodes in a group. The update requests may be normally distributed evenly through time.

A computer system that is configured to distribute updates for a key is also described. The computer system includes a processor and memory in electronic communication with the processor. Instructions are stored in the memory. One or more update requests are received per unit of time. The number of received update requests per unit of time is multiplied by a maximum update period. A total number of received update requests per unit of time is determined. An amount representing additional update requests per unit of time is obtained. A minimum update period for a group of nodes is determined.

A computer-readable medium comprising executable instructions for distributing updates for a key during a minimum update period is also described. One or more update requests are received per unit of time. The number of received update requests per unit of time is multiplied by a maximum update period. A total number of received update requests per unit of time is determined. An amount representing additional update requests per unit of time is obtained. A minimum update period for a group of nodes is determined.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

As used herein, the terms "an embodiment", "embodiment", "embodiments", "the embodiment", "the embodiments", "one or more embodiments", "some embodiments", "certain embodiments", "one embodiment", "another embodiment" and the like mean "one or more (but not necessarily all) embodiments of the disclosed invention(s)", unless expressly specified otherwise.

The term "determining" (and grammatical variants thereof) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

When a centralized server, such as an authentication server, is used to manage secure multicast groups, each member (or node) of the group may periodically validate that a key distributed from the server has not changed. The key may enable the node to join the multicast group and receive a group key. The key may be referred to as a key exchange key (KEK). Each group may have a different KEK. Periodically validating the KEK may cause issues between timely updates (i.e., using frequent checks) and network usage (i.e., using fewer checks). In one embodiment, less frequent checks are sent to the server until the distributed KEK changes. When a change to the KEK occurs, the server may desire to rekey each active node belonging to the group as quickly as possible.

In one embodiment, an authentication server maintains minimal states regarding multicast groups. For example, the server may maintain the nodes that may authenticate as members of the group and the server may maintain the KEK. The KEK may be used by the nodes to join the actual group. Maintaining minimal states allows the system to be safe from the authentication server going down or switching to a redundant authentication server in which there may be little or no shared authentication server state.

Nodes within a group may not trust each other regarding the KEK. In one embodiment, a node that has been corrupted may mislead the remaining nodes within the group about the KEK. The authentication server may be trusted to distribute or validate the KEK, which may place a large load on the authentication server. However, the authentication server may not possess an exact count of the number of active nodes in a group at any time. Not knowing the number of active nodes in the group increases the difficulty for the authentication server to determine how to optimally distribute update requests to check for an updated KEK if it wants the nodes in the group to send the requests as quickly as possible. For example, a group with ten active nodes may be rekeyed with changes to the KEK in a few seconds. However, a group with 10,000 active nodes may not be rekeyed as quickly. If all 10,000 nodes in the group sent a request to the authentication server to be rekeyed in a few seconds, the server or network may not be able to handle the large traffic load.

FIG. 1 is a block diagram illustrating one embodiment of a server 102 communicating a key exchange key (KEK) 104 to one or more nodes within group A 106. In one embodiment, the server 102 is an authentication server. An authentication server may be a server that authenticates nodes desiring to join group A 106. In one embodiment, the server 102 authenticates a node and the node receives the KEK 104. A node may join group A 106 by using the KEK 104 to prove its ability to join group A 106 to the other nodes already belonging to group A 106. In one embodiment, the server 102 maintains a minimal state regarding each node of group A 106. For example, the server 102 may maintain information used to authenticate a particular node N 116 as being able to join group A 106. In one embodiment, the server 102 maintains minimal state regarding each group A 106. For example, the server 102 may simply maintain the state of the KEK 104. The server 102 may communicate changes to the KEK 104 to the nodes of group A 106.

As illustrated, group A 106 includes node A 108, node B 110 and node C 112. While group A 106 is illustrated with only three nodes, it is to be understood that group A 106 may include more or less nodes. Group A 106 may be referred to as a secure multicast group because nodes within group A 106 may multicast information to each other in a secure manner. For example, information that is multicast between the nodes of group A 106 may be encrypted with a shared group A key 114. The nodes may use the KEK 104 to receive the group A key 114 that is associated with group A 106. For example, node N 116 may request to become a member of group A 106 by sending a group request 118 to one or more nodes of group A 106. The one or more nodes of group A 106 may determine if node N 116 includes the KEK 104. If node N 116 includes the KEK 104, the one or more nodes may distribute the group A key 114 to node N 116. The group A key 114 may enable a node to send information to and receive information from other nodes within group A 106. Nodes may use the group A key 114 to encrypt and decrypt information that is multicast between the nodes of group A 106.

If node N 116 does not include the KEK 104, node N 116 may send a KEK request 120 to the server 102, requesting that the server 102 distribute the KEK 104 to node N 116. The server 102 may authenticate node N 116 and distribute the KEK 104. However, if the KEK 104 is not distributed to node N 116, node N 116 may not join group A 106 and receive the group A key 114.

Communications between the server 102, group A 106 and node N 116 may be over a network 122. The network 122 may include the Internet, a phone network, a pager network, etc. In one embodiment, the server 102 may manage and communicate with multiple groups of nodes over the network 122. The server 102 may distribute a KEK that is specific to each group of nodes.

Figure 2:
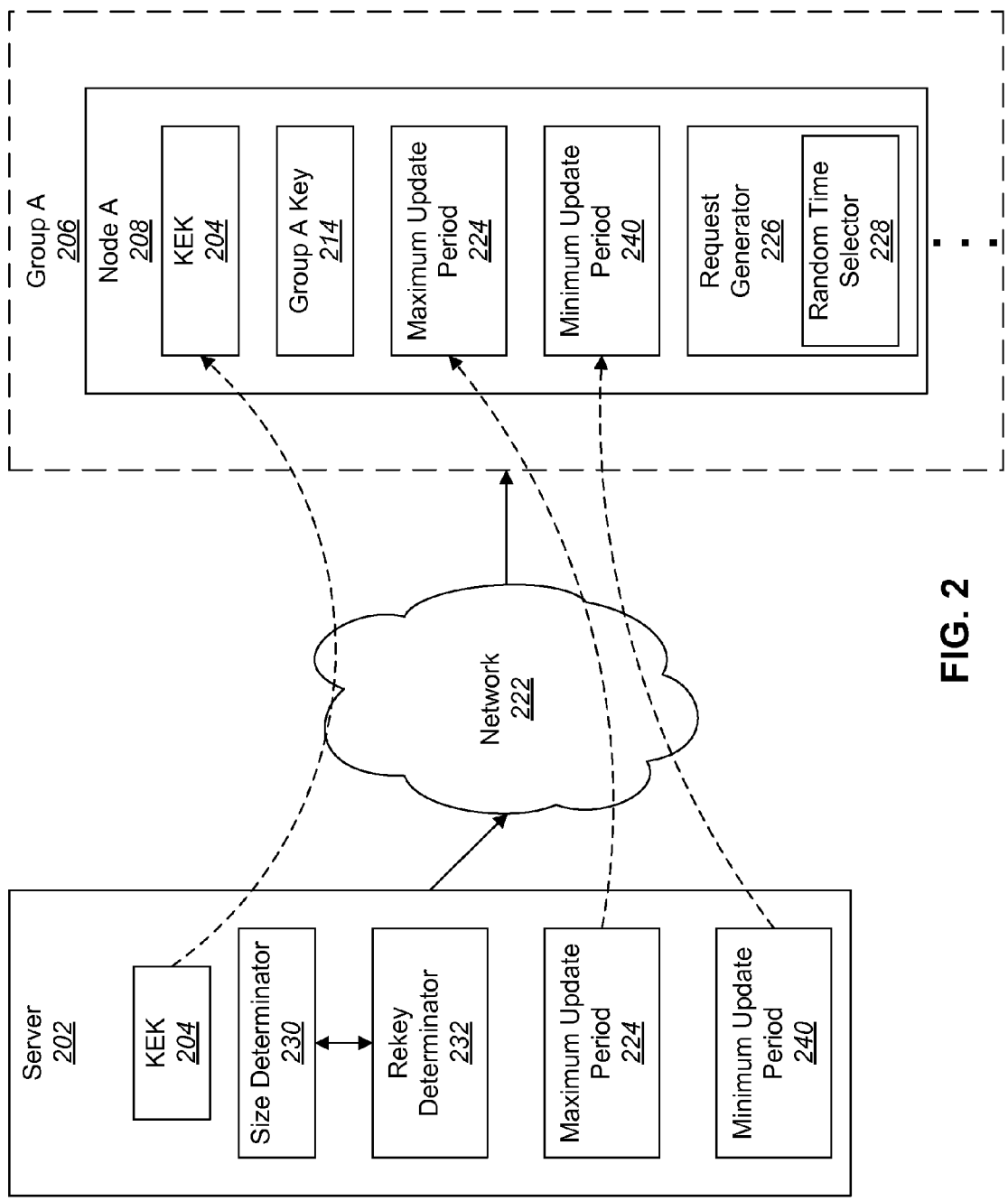
FIG. 2 is a block diagram illustrating a further embodiment of a server communicating with a group of nodes over a network.

FIG. 2 is a block diagram illustrating a further embodiment of a server 202 communicating with a group of nodes over a network 222. The group of nodes may include group A 206. For clarity purposes, only node A 208 is illustrated within group A 206. However, each node within group A 206 may be similar to node A 208. In one embodiment, node A 208 may determine a maximum update period 224. The maximum update period 224 may indicate the maximum amount of time a node may trust a KEK 204 without checking the server 202 for changes to the KEK 204. For example, group A 206 may include a maximum update period 224 of twenty-four hours, which implies that each node belonging to group A 206 may send a request to the server 202 for changes to the KEK 204 once every twenty-four hours. In one embodiment, the maximum update period 224 may be first determined by the server 202 and then passed to the node in response to the KEK request 120. In a further embodiment, the node 208 may obtain the maximum update period 224 from another node already in the group A 206.

Node A 208 may also include a request generator 226. The request generator 226 may generate update requests which query the server 202 for changes to the KEK 204. For example, the server 202 may change the KEK 204, and node A 208 may generate an update request to discover the changes to the KEK 204. The request generator 226 may also include a random time selector 228. In one embodiment, the random time selector 228 randomly selects the time to send the update requests to the server 202. The selector 228 may randomly select a time that is less than the maximum update period 224. For example, if the maximum update period 224 includes twenty-four hours, the update request may be randomly sent to the server 202 during the tenth hour. Node A 208 may send an update request at the tenth hour and then another update request at the end of the maximum update period 224 (i.e., twenty-four hours). In one embodiment, the nodes within group A 206 evenly distribute their generated update requests to the server 202. For example, if group A 206 includes twenty-four nodes, a first node may send an update request in the first hour (and then another update request after the maximum update period 224); a second node may send an update request in the second hour (and then another update request after the maximum update period 224), etc.

In one embodiment, the server 202 includes a size determinator 230. The size determinator 230 facilitates the server 202 to determine approximately how many nodes may be active within a particular group, such as group A 206. An active node may include a node which generates and sends update requests to the server 202 regarding the KEK 204. The server 202 may utilize the size determinator 230 to determine the approximate number of active nodes in group A 206. In one embodiment, the size determinator 230 multiplies the maximum update period 224 with a request rate associated with group A 206. The request rate may indicate the number of KEK 204 update requests the server 202 receives from nodes within group A 206 per unit of time. For example, the maximum update period 224 associated with each node may include twenty-four hours, and the server 202 may be receiving ten requests per hour from nodes within group A 206. Hence, the size determinator 230 may estimate that group A 206 includes two hundred and forty active nodes (ten requests/hour multiplied by twenty-four hours).

In one embodiment, the server 202 includes a rekey determinator 232. The rekey determinator 232 may determine a minimum update period 240 that represents the minimum time required for the server 202 to rekey all active nodes within a group, causing a maximum load for the server 202. In one embodiment, rekeying each active node within a group includes changing the KEK 204 stored on each node. The rekey determinator 232 may determine its current load using all requests over a certain time slice. In one embodiment, this may be done using a floating average. The rekey determinator 232 may then determine the number of additional requests per second that the server 202 may satisfy by subtracting its 202 current load from a determined maximum load. The rekey determinator 232 may also access the size determinator 230 to obtain the estimated number of active nodes in a particular group. In one embodiment, the rekey determinator 232 may divide the number of active nodes in a group by the determined additional requests per unit time to obtain the minimum update period 240, which is the time required by the server 202 to rekey an entire group of active nodes using a maximum load. For example, server 202 may determine that it is currently servicing ten update requests per unit of time. The maximum load may be determined to be twenty update requests per unit of time. The size determinator 230 may determine an estimate of the size of group A 206 to be two hundred and forty active nodes. As such, the rekey determinator 232 may determine that the server 202 requires about twenty-four units of time to rekey the KEK 204 stored on each active node within group A 206 (two hundred and forty nodes divided by the 10 additional requests possible per unit of time). In an embodiment, the minimum update period 240 is distributed to node A 208 along with the KEK 204. In a further embodiment, both the minimum update period 240 and the maximum update period 224 are distributed to node A 208 along with the KEK 204.

Figure 3:
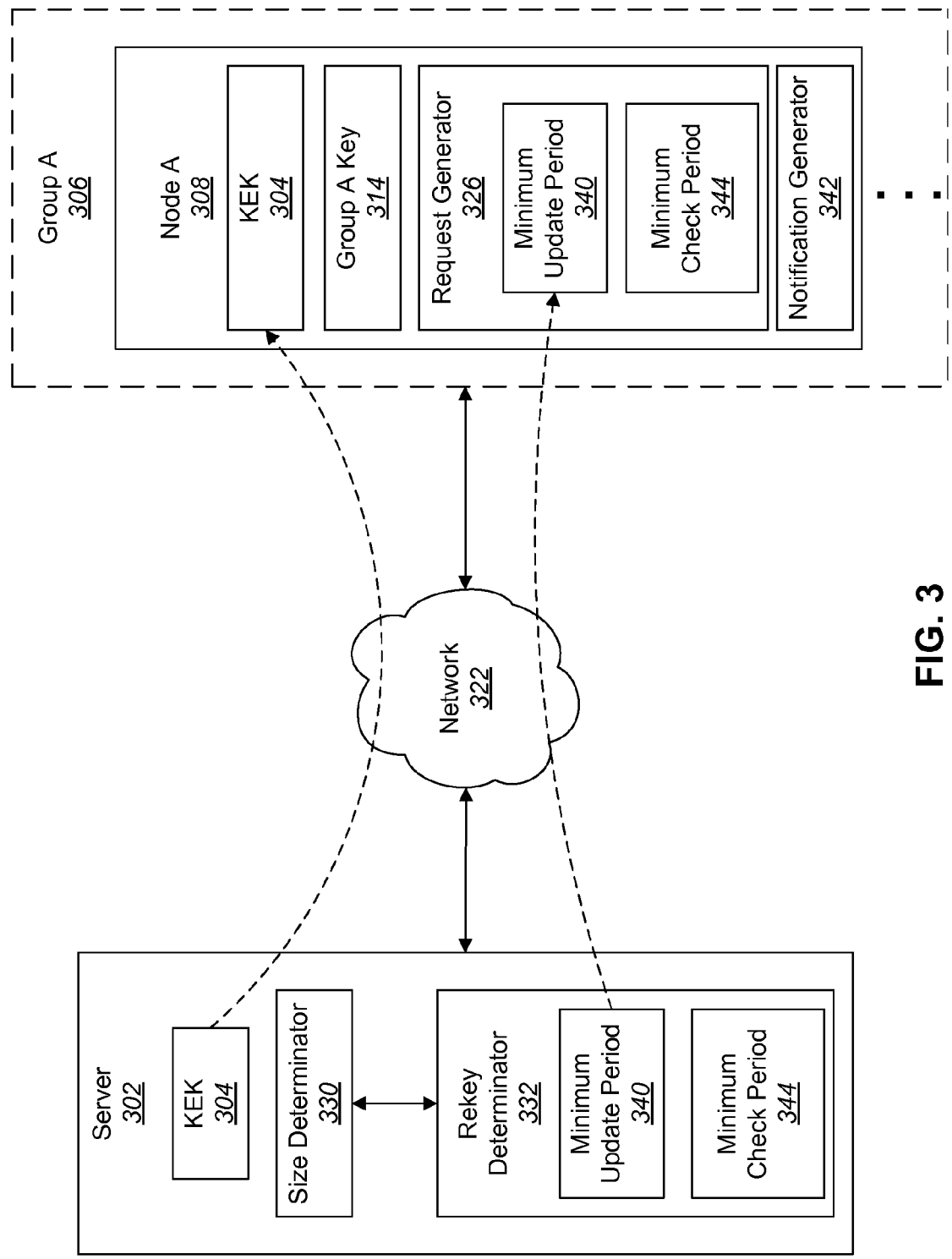
FIG. 3 is a block diagram illustrating one embodiment of a single node sending update requests to a server using a minimum request period in order to check for changes to a KEK.

FIG. 3 is a block diagram illustrating one embodiment of a single node A 308 sending update requests to a server 302 using a minimum check period 344 in order to check for changes to a KEK 304. As previously explained, the server 302 may include the KEK 304 which is distributed to the nodes within a group, such as group A 306, over a network 322. The KEK 304 may enable a node to obtain a group A key 314 which allows the node to securely communicate with other nodes within group A 306. The server 302 also includes a size determinator 330 that may enable the server 302 to estimate the number of active nodes within group A 306 as previously explained. In one embodiment, the server 302 includes a rekey determinator 332 which may include a minimum update period 340. The minimum update period 340 may be determined in a manner as previously explained and may indicate the minimum time required by the server 302 to distribute the KEK 304 to each active node of group A 306 using a maximum load.

In one embodiment, the rekey determinator 332 may also include a minimum check period 344. The minimum check period 344 may indicate the minimum time between requests (maximum rate) at which the server 302 may prefer to service normal update requests from a single node to check for updates to the KEK 304. In one embodiment, the minimum check period 344 may be predetermined by a system administrator. In another embodiment, the minimum check period 344 may be determined in a similar manner to the minimum update period 340. Thus, the minimum check period 344 and the minimum update period 340 may be similar. In one embodiment, the minimum check period 344 may serve only as a guide to nodes within group A 306, and may not be enforced by either a node 308, or the server 302.

The server 302 may distribute the minimum check period 344 to node A 308. Node A 308 may include a request generator 326 which may generate update requests to query the server 302 for changes to the KEK 304. In one embodiment, the request generator 326 sends update requests at the rate specified by the minimum check period 344. Node A 308 may be the only node within group A 306 sending update requests at the rate specified by the minimum check period 344. In another embodiment, group A 306 includes a small set of nodes that each includes a request generator 326 that sends update requests to the server 302 at the rate specified by the minimum check period 344. In another embodiment, group A 306 may include a large set of nodes that each includes a request generator 326 that send update requests to the server 302 at the rate specified by the maximum update period 224.

The benefits of using a minimum check period 344 on a small set of nodes is that the single node may then notify the other nodes in a group that the KEK has changed, enabling them to use the determined minimum update period 340 to update the KEK. This logic minimizes the load on the server 302 when the KEK has not changed, and also minimizes the time required to distribute a changed KEK to all nodes in the group. In one embodiment, node A 308 includes a notification generator 342. The notification generator 342 may generate notifications that signal other nodes within group A 306 when changes to the KEK 304 exist. In one embodiment, node A 308 securely multicasts the notifications to the additional nodes within group A 306. The additional nodes may also include the KEK 304. The additional nodes may generate update requests and send these update requests to the server 302 in order to rekey the KEK 304. The notification generator 342 may also include the minimum update period 340, which notifies the additional nodes of the minimum period in which update requests may be sent to the server 302 to retrieve the updated KEK 304. In another embodiment, the additional nodes may use a random time selector to determine when to get the updated KEK 304 within the minimum update period 340.

Figure 4:
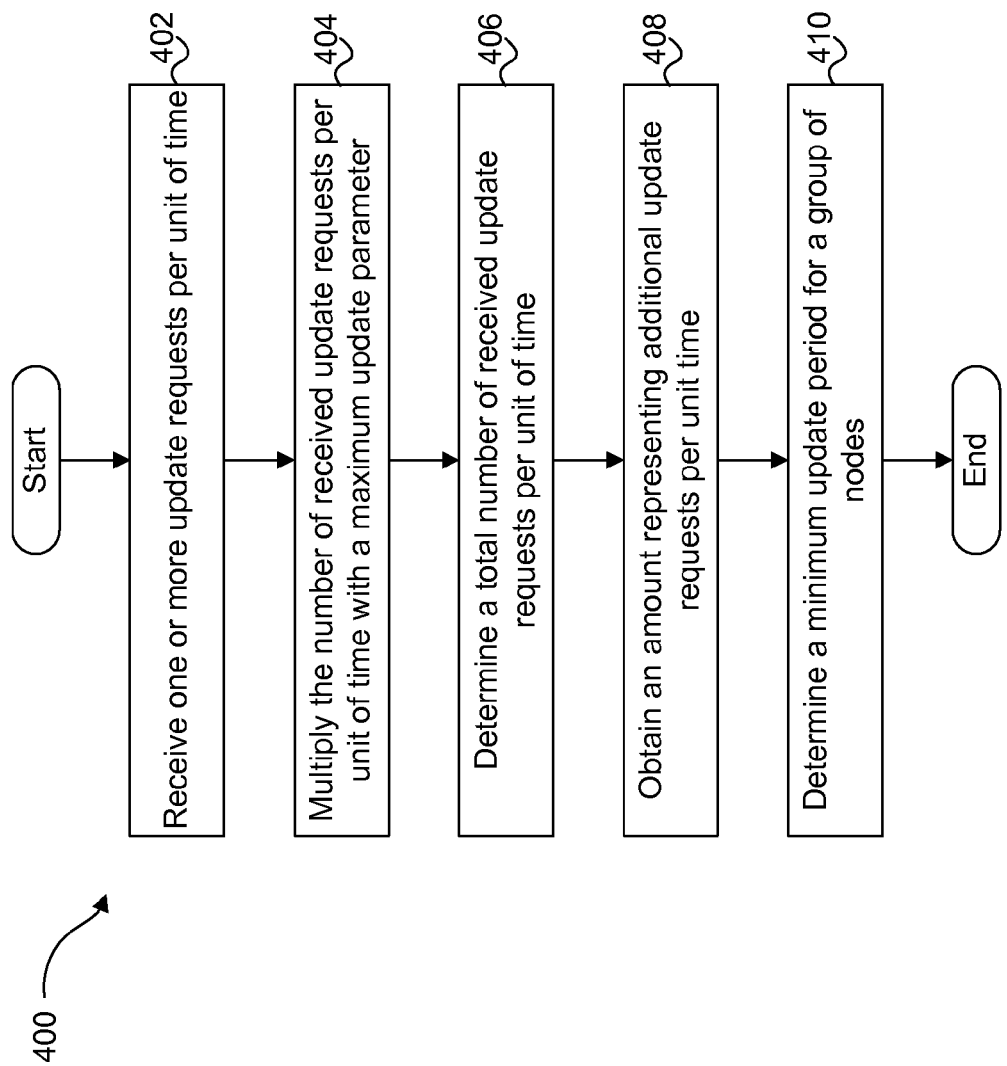
FIG. 4 is a flow diagram illustrating one embodiment of a method for determining a minimum update period for a group of nodes.

FIG. 4 is a flow diagram illustrating one embodiment of a method 400 for determining a minimum update period 240 for a group of nodes. In one embodiment, the method 400 may be implemented by a server 102, such as an authentication server. The minimum update period 240 may indicate the time during which the server may rekey nodes within a group. Rekeying nodes may include updating the KEK 104 stored on each active node within the group.

In one embodiment, one or more update requests per unit of time are received 402. The update requests may include a query as to whether the KEK 104 stored on the server 102 has changed. The number of received update requests per unit time may be multiplied 404 with a maximum update period 224. The maximum update period 224 may represent the maximum amount of time that a node may trust the KEK 104 before sending an update request regarding changes to the KEK 104. The product of multiplying the received update requests and the maximum update period 224 may yield an estimate of active nodes within a group.

In one embodiment, the total number of received update requests per unit of time is determined 406. The total number of received update requests per unit of time may represent the total number of update requests that the sever 102 is serving at any time to all groups. In one embodiment, an amount representing additional update requests per unit time is obtained 408. The amount representing additional update requests may be obtained 408 by subtracting the total number of received requests from a determined maximum. As previously explained, the determined maximum may include the maximum number of update requests that the server 102 may service per unit time. A minimum update period 240 is determined 410 for a group of nodes. In one embodiment, the minimum update period 240 indicates the time required for the server 102 to rekey each active node within the group A 206. Rekeying each active node may include updating the KEK 104 on each active node within the group A 206. As previously explained, the minimum update period 240 may be determined by dividing the estimate of active nodes within the group A 206 by the amount representing additional update requests per unit of time.

Figure 5:
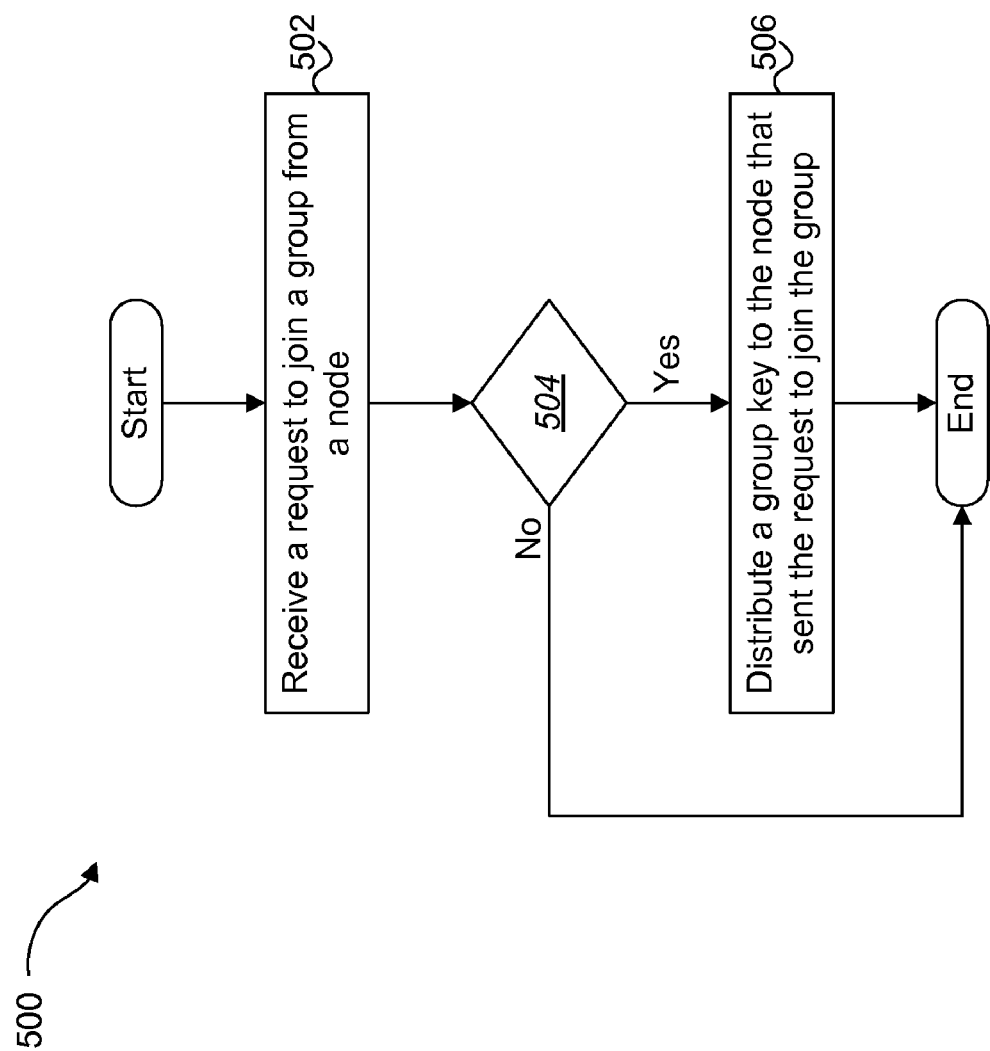
FIG. 5 is a flow diagram illustrating one embodiment of a method for determining whether a node may join a group of nodes.

FIG. 5 is a flow diagram illustrating one embodiment of a method 500 for determining whether a node may join a group of nodes. In one embodiment, the method 500 may be implemented by an individual node belonging to the group. A request to join the group of nodes may be received 502. The request may include a parameter determined by a KEK. A determination is made whether the parameter included with the request results from 504 the KEK 104 associated with each node within the group. For example, node A 108 may receive 502 a request from node N 116 requesting that node N 116 become a member of group A 106. The request may include a parameter determined by a KEK. Node A 108 may determine 504 if the KEK associated with the request matches the KEK 104 associated with node A 108. If a determination 504 is made that the KEK associated with the request does not match the KEK 104 associated with node A 108, or if node N 116 does not possess a KEK, the method 500 ends. If a determination 504 is made that the KEKs match, a group key 114 is distributed 506 to the node N 116. In one embodiment, the group key 114 allows a node to receive secure data from other nodes belonging to the group. The group key may also allow a node to securely send data to the other nodes in the group.

Figure 6:
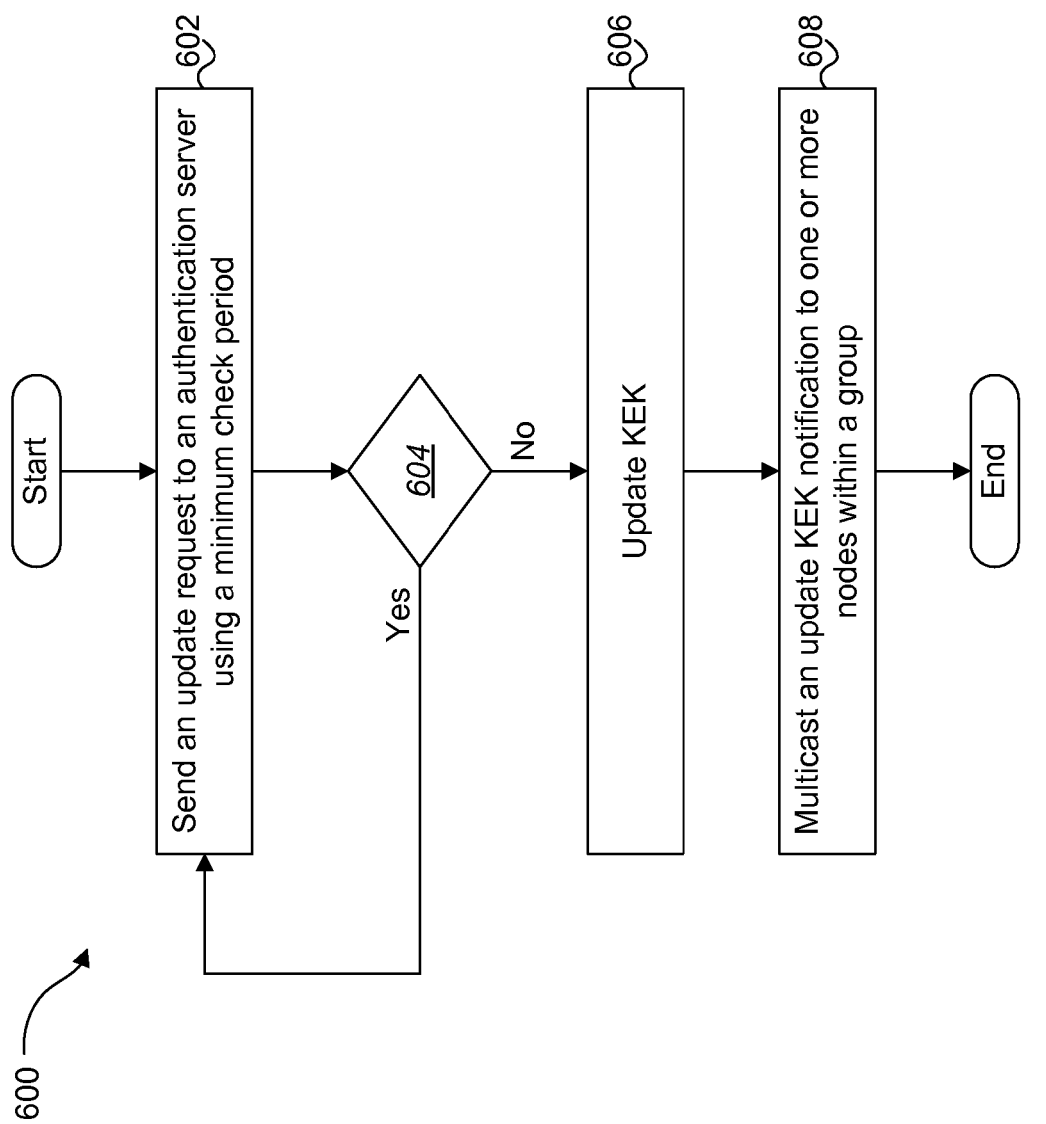
FIG. 6 is a flow diagram illustrating one embodiment of a method for notifying additional nodes in a group about changes to a KEK.

FIG. 6 is a flow diagram illustrating one embodiment of a method 600 for notifying additional nodes in a group about changes to a KEK. In one embodiment, the method 600 is implemented by a single node. In a further embodiment, the method 600 is implemented by a small group of nodes.

An update request may be sent 602 to a server 102 using a minimum check period. The update request may include a query regarding changes to the KEK 104 associated with the group. The server 102 may include an authentication server. The server 102 may respond to the request. In one embodiment, the response includes the KEK 104 associated with the group identified by the node that sent the request. A determination 604 is made whether the KEK 104 included with the response matches the KEK 104 on the node. If the KEKs match 604, the node continues to send 602 another update request after the minimum check period 344 has elapsed. If the KEKs don't match 604, the KEK 104 on the node is updated 606 to match the KEK 104 on the server 102. In one embodiment, the server 102 may change the KEK 104 periodically to protect the integrity of the group of nodes. An update KEK notification may be multicast 608 to one or more nodes within the group. In one embodiment, the notification is multicast to the group from the node that was sending 602 the update requests to the server 102. The notification may also include the minimum update period 240. In one embodiment, the one or more nodes may send an update request to the server 102 after receiving the notification. The update requests may be sent within the minimum update period 240.

Figure 7:
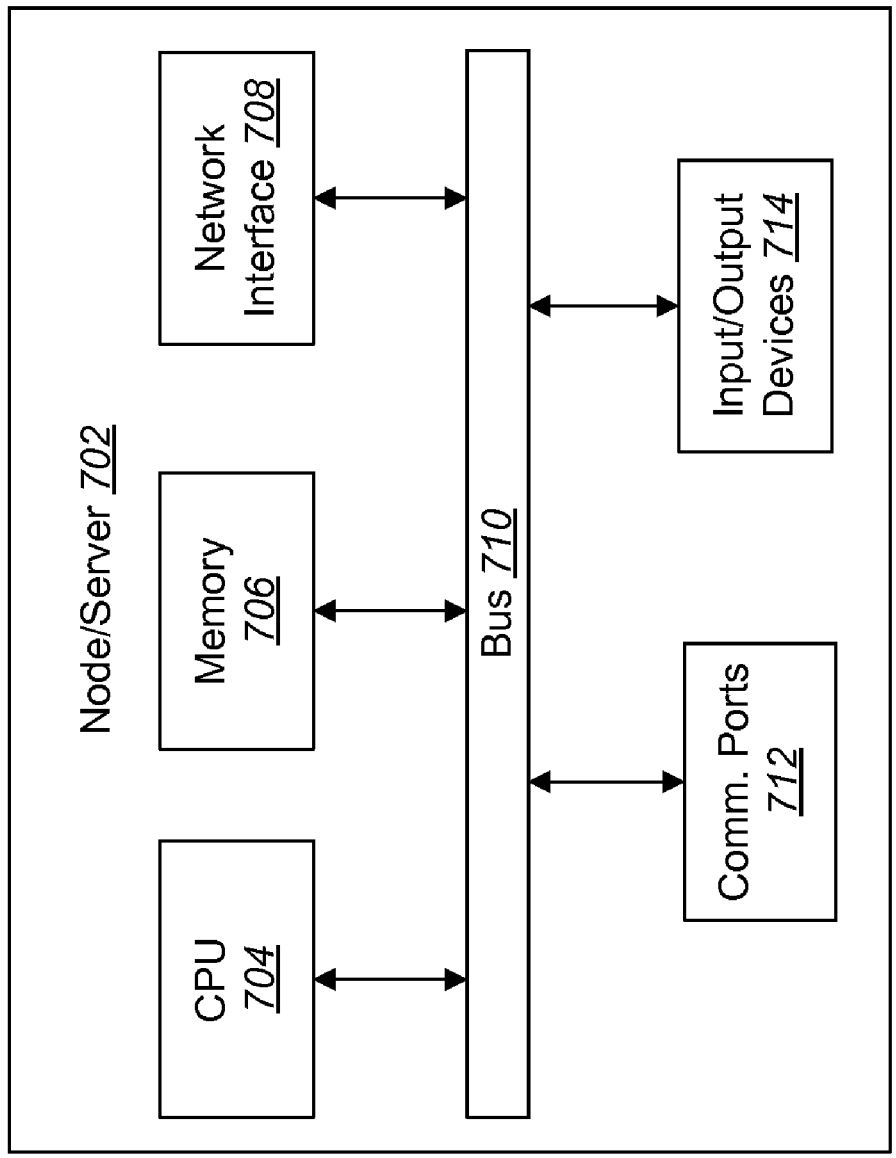
FIG. 7 is a block diagram of hardware components that may be used in an embedded device that is configured according to an embodiment.

FIG. 7 is a block diagram of hardware components that may be used in a node or server 702 that is configured according to an embodiment. The node or server 702 may be implemented in an embedded device/computing device 702. A central processing unit (CPU) 704 or processor may be provided to control the operation of the embedded device 702, including the other components thereof, which are coupled to the CPU 704 via a bus 710. The CPU 704 may be embodied as a microprocessor, microcontroller, digital signal processor or other device known in the art. The CPU 704 performs logical and arithmetic operations based on program code stored within the memory. In certain embodiments, the memory 706 may be on-board memory included with the CPU 704. For example, microcontrollers often include a certain amount of on-board memory.

The embedded device 702 may also include a network interface 708. The network interface 708 facilitates communication between the embedded device 702 and other devices connected to the network 122, which may be a pager network, a cellular network, a global communications network, the Internet, a computer network, a telephone network, etc. The network interface 708 operates according to standard protocols for the applicable network 122.

The embedded device 702 may also include memory 706. The memory 706 may include random access memory (RAM) for storing temporary data. Alternatively, or in addition, the memory 706 may include read-only memory (ROM) for storing more permanent data, such as fixed code and configuration data. The memory 706 may also be embodied as a magnetic storage device, such as a hard disk drive. The memory 706 may be any type of electronic device capable of storing electronic information.

The embedded device 702 may also include one or more communication ports 712, which facilitate communication with other devices. The embedded device 702 may also include input/output devices 714, such as a keyboard, a mouse, a joystick, a touchscreen, a monitor, speakers, a printer, etc.

Of course, FIG. 7 illustrates only one possible configuration of an embedded device 702. Various other architectures and components may be utilized.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for distributing updates for a key, the method being implemented by a computing device, the method comprising:

receiving one or more update requests per unit of time;

multiplying, by the computing device, the number of received update requests per unit of time by a maximum update period, wherein the maximum update period represents the maximum amount of time a node utilizes a key exchange key (KEK) before sending an update request;

determining, by the computing device, a total number of received update requests per unit of time;

obtaining an amount representing additional update requests per unit of time; and determining a minimum update period to update a KEK for a group of nodes, wherein the minimum update period is determined by multiplying the number of received update requests per unit of time with a maximum update parameter and dividing this product by the amount representing additional update requests per unit of time.

2. The method of claim 1, wherein the amount representing additional update requests per unit of time is obtained by subtracting the determined total number of received update requests per unit of time from a determined maximum of update requests desired per unit of time.

3. The method of claim 1, further comprising receiving an update request from a single node during each minimum check period.

4. The method of claim 1, wherein the update request comprises a request to rekey the key exchange key (KEK).

5. The method of claim 4, wherein the KEK is used to join a secure multicast group of nodes.

6. The method of claim 1, further comprising maintaining a minimal state regarding a group of nodes, wherein the minimal state comprises nodes that may obtain the key exchange key (KEK) and join the group.

7. The method of claim 1, wherein multiplying the number of received update requests per unit of time by a maximum update period provides an estimate of the number of active nodes in a group.

8. The method of claim 1, wherein the update requests are normally distributed evenly through time.

9. A computer system that is configured to distribute updates for a key, the computer system comprising:

a processor;

memory in electronic communication with the processor;

instructions stored in the memory, the instructions being executable to:

receive one or more update requests per unit of time;

multiply the number of received update requests per unit of time by a maximum update period, wherein the maximum update period represents the maximum amount of time a node utilizes a key exchange key (KEK) before sending an update request;

determine a total number of received update requests per unit of time;

obtain an amount representing additional update requests per unit of time; and determine a minimum update period to update a KEK for a group of nodes, wherein the minimum update period is determined by multiplying the number of received update requests per unit of time with a maximum update parameter and dividing this product by the amount representing additional update requests per unit of time.

10. The computer system of claim 9, wherein the amount representing additional update requests per unit of time is obtained by subtracting the determined total number of received update requests per unit of time from a determined maximum of update requests desired per unit of time.

11. The computer system of claim 9, further comprising an update request is received from a single node during each minimum check period.

12. The computer system of claim 9, wherein the update request comprises a request to update the key exchange key (KEK).

13. A non-transitory computer-readable medium comprising executable instructions for distributing updates for a key during a minimum update period, the instructions being executable to:

receive one or more update requests per unit of time;

multiply the number of received update requests per unit of time by a maximum update period, wherein the maximum update period represents the maximum amount of time a node utilizes a key exchange key (KEK) before sending an update request;

determine a total number of received update requests per unit of time;

obtain an amount representing additional update requests per unit of time; and determine a minimum update period to update a KEK for a group of nodes, wherein the minimum update period is determined by multiplying the number of received update requests per unit of time with a maximum update period and dividing this product by the amount representing additional update requests per unit of time.

14. The non-transitory computer-readable medium of claim 13, wherein the amount representing additional update requests per unit of time is obtained by subtracting the determined total number of received update requests per unit of time from a determined maximum of update requests desired per unit of time.

15. The non-transitory computer-readable medium of claim 13, wherein the instructions are further executable to receive an update request from a single node during each minimum check period.

16. The non-transitory computer-readable medium of claim 13, wherein the update request comprises a request to update the key exchange key (KEK).

* * * * *